United States Patent

De Santis

[15] 3,654,813

[45] Apr. 11, 1972

[54] ANNULAR STRUCTURES REINFORCED WITH TEXTILE ELEMENTS, IN PARTICULAR, RUBBING ELEMENTS FOR CARDING MACHINES

[72] Inventor: Ermenegildo De Santis, Milan, Italy

[73] Assignee: Industrie Pirelli S.p.A., Milan, Italy

[22] Filed: Aug. 19, 1970

[21] Appl. No.: 65,249

Related U.S. Application Data

[63] Continuation of Ser. No. 654,767, July 20, 1967, abandoned.

[30] Foreign Application Priority Data

July 27, 1966 Italy....................................17355/66
May 11, 1967 Italy..................................15958 A/67

[52] U.S. Cl.............................................74/232, 19/153
[51] Int. Cl. ..................F16g 1/26, D01g 25/00, D01g 27/00
[58] Field of Search.............................74/232, 237; 19/153

[56] References Cited

UNITED STATES PATENTS

| 1,970,509 | 8/1934 | De Wein et al. | 74/63 |
| 2,514,429 | 7/1950 | Waugh | 74/232 |
| 2,630,603 | 3/1953 | Freedlander et al. | 19/153 |
| 2,698,032 | 12/1954 | Bacon | 139/161 |
| 2,717,427 | 9/1955 | Twomey | 19/153 |
| 1,970,509 | 8/1934 | De Wein et al. | 161/57 |
| 2,514,429 | 7/1950 | Waugh | 161/57 |

*Primary Examiner*—Leonard H. Gerin
*Attorney*—Stevens, Davis, Miller & Mosher

[57] ABSTRACT

A rubber structure adapted for use as an accessory in machines for the textile industry, which includes an annular sheet of rubber composition forming the underlayer of the structure, a layer of cord fabric suitably treated or made adhesive and disposed over the sheet with its cords extending parallel to the axis of the structure, and an additional sheet of rubber composition extending over the layer of cord fabric. A layer of textile reinforcement constituted by a cord or twisted yarn is helically wound up at a small pitch on the additional sheet of rubber composition and is covered by an additional sheet of rubber composition.

18 Claims, 4 Drawing Figures

INVENTOR
Ermenegildo DeSantis

PATENTED APR 11 1972  3,654,813

INVENTOR

Ermenegildo De Santis

BY Stevens, Davis, Miller & Mosher
ATTORNEYS

3,654,813

ANNULAR STRUCTURES REINFORCED WITH TEXTILE ELEMENTS, IN PARTICULAR, RUBBING ELEMENTS FOR CARDING MACHINES

This application is a continuation of application Ser. No. 654,767, filed July 20, 1967, now abandoned.

BACKGROUND OF THE INVENTION

1. Field of the Invention

The present invention relates to an annular rubber structure, and more particularly, to such a structure utilized as a rubbing apron in the manufacture of textiles.

2. Prior Art

Other than in pneumatic tires, there are several requirements for a rubber structure which can withstand a high mechanical resistance without wearing out. For example, in the manufacturing of textiles various machinery is utilized in which accessories are employed which require the use of such a rubber structure. The rubber structures so utilized can be both structures exerting pressure and simultaneously rubbing the sliver, such as rubbing sleeves; and structures exerting only pressure on the sliver, such as for instance high draft aprons, aprons for intersecting gill boxes, drawing frames, converters, and aprons for drawing heads. These structures are generally subjected only to circumferential movements at a very high speed, which involves an extremely rapid wear of the article.

A particular requirement for an annular rubber structure is in the use of rubbing aprons utilized in conjunction with a carding machine in the manufacture of textiles. Specifically, in such a machine, a card or web of wool, or natural or synthetic textile fibers, is passed from this machine into the rubbing aprons, which convert it into substantially round slivers which are then subjected to subsequent stretching, combing, twisting, etc.

In general, the two rubbing aprons are each put into motion by two draft rollers having such a rotation that the facing parts of the aprons move at the same speed and in the same direction, thus causing a progressive forward motion of the slivers. At the same time, suitable mechanical cam devices impart to the pairs of draft rollers a quick to and fro movement, in phased opposition, in a direction parallel to the axis of the draft rollers. This imparts a rubbing action to the slivers which is made more efficient by use of a plurality of grooves formed in the surface of the aprons and extending for their whole length. Moreover, each apron is provided with a plurality of studs projecting inwardly, which receive the axial thrust of the draft rollers, due to the alternating to and fro movement.

The rubbing aprons are tubular flexible elements, having a length variable according to the width of the condenser card. Their diameter is such as to comply with the requirements of the assembly, namely the distance between the axes of the draft rollers between which the aprons are tensioned, and the diameter of the pairs of said draft rollers. In the practice, there may be girths ranging between 400 and 1,200 mm.

Apart from possible faults due to other operations, the regularity and the homogeneousness of the sliver delivered from each pair of aprons, which affect the regularity of the final yarn, is due to the rubbing action on the sliver and the simultaneous forward motion of same. It is therefore evident that, all other conditions being constant, a perfect sliver can be obtained if the girth of the two aprons is constant along their whole length and if it remains such, without the occurrence of slack or protuberances during service. In other words, the two facing parts of the pair of aprons must be and remain perfectly flat, equidistant and uniformly tensioned.

The leather aprons, which were originally used, were excessively expensive and not quite homogeneous on account of their material, and were later replaced with aprons made of synthetic elastomeric material, as for instance butadiene-acrylonitrile rubber compositions, which were reinforced with textile insertions constituted by plies. The employment of said insertions, having warp and weft, is necessary because the aprons suffer stresses in the direction of their length during their rubbing action and stresses in the direction of their girth during their rotating motion. In view of this, the insertion is disposed in such a way that its warp and weft are respectively positioned along the generatrices and the girth of the apron.

These known rubbing aprons are generally manufactured by winding up, on a metallic core or mandrel of circular cross-section, one or more rubberized plies. The outer diameter of the mandrel corresponds to the inner diameter of the apron to be manufactured and the mandrel has a length greater than that of the latter. Subsequent layers of thin sheets of calendered rubber are then applied which form the underlayer of the apron after which a rubber sheet or strip constituting the covering is applied, said strip having a suitable thickness to take into account the excessive material to be removed in the final trimming of the apron after its vulcanization.

The rubberized plies are generally available in pieces of indefinite length and of limited width, not exceeding 2 meters. This involves in all cases an overlapped joint in the longitudinal direction and very often, namely each time the length of the apron is greater than the width of the rubberized ply, a further overlapped joint in the transversal direction so that, in a portion of the apron, there is a superposition of the joints in the two directions.

The covering sheet subsequently applied and the final trimming of the apron after vulcanization normally hide these joints. However, on account of their presence, undue elongations and consequently irregular girths take place during the use of the apron, so that the facing parts of the pairs of aprons exerting the rubbing action are not perfectly flat, regular and equidistant.

Another reason for irregularity is the peculiar feature of the raw plies, which is more evident during their rubberizing, according to which they are never perfectly flat, but show folds and undulations which contribute to adversely affecting the homogeneous behavior of the apron in its various portions.

SUMMARY OF THE INVENTION

The object of the present invention is to provide a rubbing apron having a perfectly uniform structure and a constant development in each portion, said structure being unaffected after a long period of service.

The applicant has ascertained that, if a cord fabric suitably treated to make it adhesive and positioned in such a way that its cords are disposed along the generatrices of the cylinder, namely parallel to the longitudinal axis of the apron, is utilized instead of the rubberized reinforcing plies generally adopted for said article; and if a cord or a twisted yarn, suitably treated or made adhesive, is helically wound on said textile insertion and suitably covered with a sheet of rubber composition, the resulting rubbing apron has a surface which is perfectly homogeneous and which maintains said homogeneity also after a prolonged and severe use. Moreover, the use of cord fabric permits a considerable saving of material and labor in comparison with the use of textile reinforcements constituted by plies.

A further object of the present invention is to provide a rubbing apron for carding machines, which substantially comprises a sheet of rubber composition forming the underlayer of the apron, a layer of adhesively treated cord fabric positioned in such a way that its cords are parallel to the axis of the apron, an additional thin sheet of rubber composition, a layer of textile reinforcement constituted by a cord or twisted yarn suitably treated or made adhesive and helically wound up at a small pitch on said thin sheet, and a covering sheet of rubber composition.

The rubber compositions constituting the elastomeric layers of the aprons are, as usual, based on synthetic elastomers of the butadiene-acrylonitrile type, and the thickness of the inner layers is very small, of the order of 0.5 mm.

BRIEF DESCRIPTION OF THE DRAWINGS

The present invention will be more clearly understood with reference to the attached drawings, given by way of nonlimiting example, in which.

DESCRIPTION OF THE PREFERRED EMBODIMENTS

Figure 1:
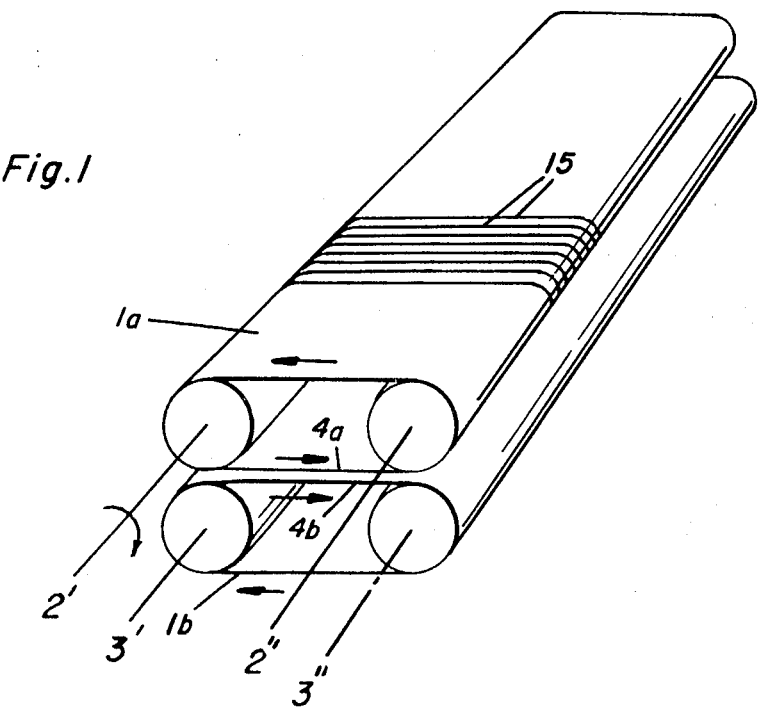
FIG. 1 represents diagrammatically a pair of rubbing aprons, their assembly and their way of operation.

Referring specifically to FIG. 1 of the drawings, the reference numerals 1a and 1b refer to a pair of rubbing aprons which are respectively put into motion by draft rollers 2' and 2'', 3' and 3'' in such a way that the two facing parts 4a and 4b of the aprons move in the same direction and at the same speed.

The reference numeral 5 indicates a plurality of grooves or lines which are generally obtained on the surface of the aprons and extend for their whole length, only a portion being depicted in the interest of clarity. For simplicity's sake, the drawing does not represent a set of studs normally provided which project inwardly, since they do not form a part of the inventive concept.

Figure 2:
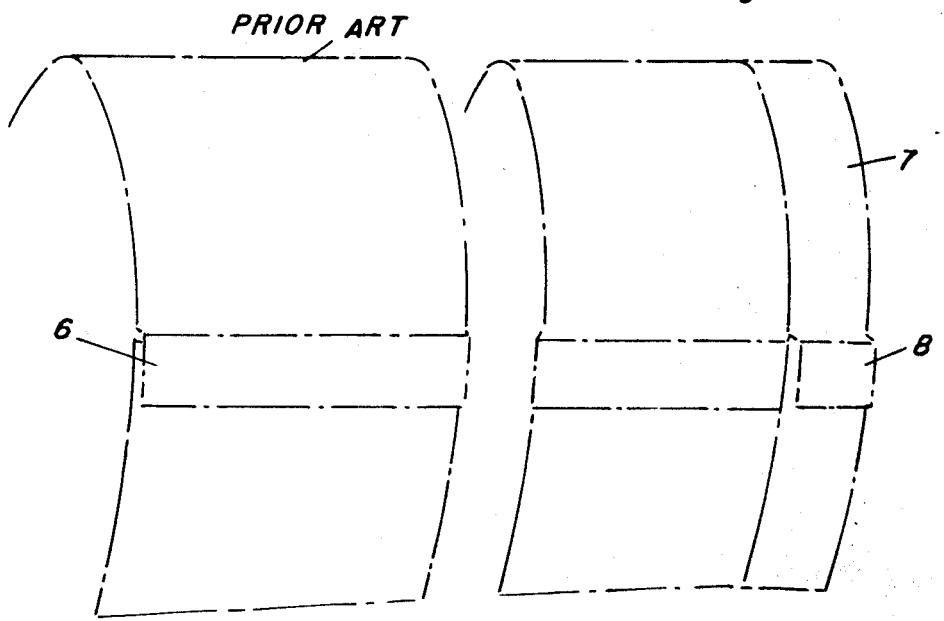
FIG. 2 represents diagrammatically the overlapping of the reinforcing plies of the prior art rubbing aprons.

FIG. 2 illustrates schematically a portion of a typical prior art rubber apron which requires the presence of an overlapped joint 6 in the longitudinal direction of the apron and an overlapped joint 7 in the transversal direction thereof. These types of joints also require the superposition of the two overlapped portions as shown at point 8.

Figure 3:
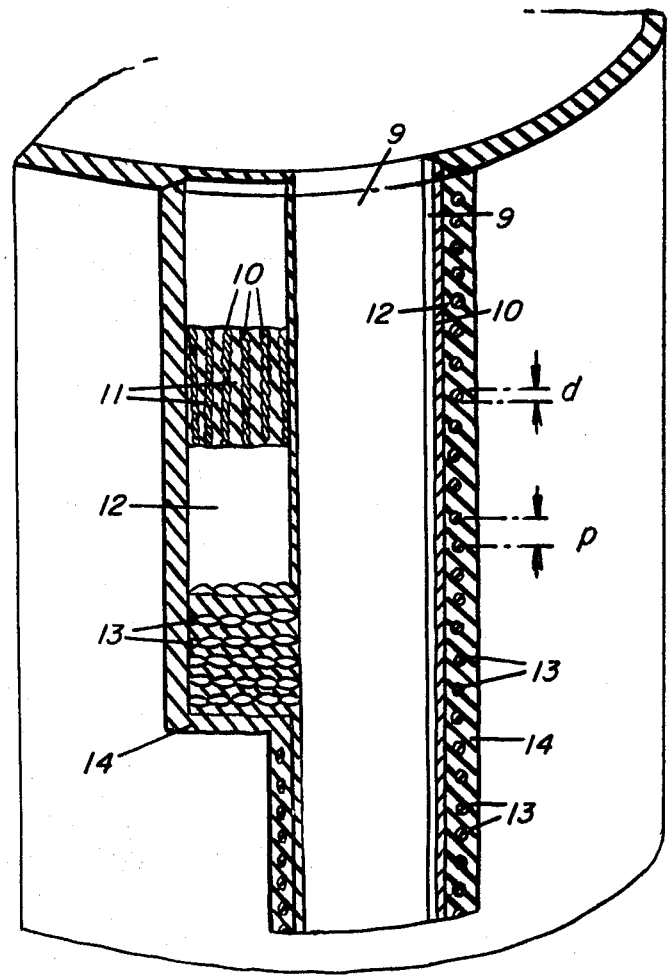
FIG. 3 represents a rubbing apron in accordance with the present invention.

FIG. 3 shows the structure of the apron according to the present invention which eliminates these overlapped and superposed joints. As shown, a thin inner sheet 9 of rubber composition is provided, over which a layer 10 of treated cord fabric is placed, the cords 11 of the layer 10 being disposed along the generatrices of the cylinder. An additional thin layer 12 of rubber composition is disposed over layer 10, and a helical winding or cord or twisted yarn 13, treated or made adhesive, is disposed over layer 12. The individual elements of the yarn 13 are slightly spaced apart from one another. Finally, a covering rubber sheet 14 is provided.

In the manufacturing of the rubbing apron according to the present invention, the inner sheet 9 of elastomeric material is disposed on a rigid metallic cylindrical mandrel of conventional type so that the sheet forms the apron underlayer. The mandrel has an outer diameter equal to the internal girth of the apron and a length considerably greater than the desired length of the apron.

The thin sheet 9 is butt-jointed or slightly overlapped, after which the layer 10 of treated cord fabric is disposed on said sheet with the cords 11 of layer 10 disposed along the generatrices of the cylinder. Subsequently the additional thin sheet 12 of rubber composition is placed on the fabric layer and the cord or twisted yarn 13 of cotton, rayon or other textile fiber, is wound up onto it in the form of a continuous cylindrical helix under controlled and constant tension.

The winding pitch $p$ with respect to the diameter $d$ of the cords or twisted yarns 13 is such that the latter are slightly spaced apart from one another. Consequently, the pitch can take a value corresponding to one to four times the value of the diameter $d$. The cord or twisted yarn 13 must be, of course, suitably treated or made adhesive according to the conventional technique and practice so that a good bond between rubber composition and textile fabric is achieved after vulcanization.

The covering rubber sheet 14 having a thickness of 5 mm, for example, and being butt-jointed, is then superposed to the assembly. The composition constituting this sheet must have the necessary characteristics of resistance to wear, rubbing capacity, resistance to the lubricants with which the textile fibers to be worked are treated, and so on, in accordance with the conventional requirements of the rubbing aprons for carding machines.

It should be understood that the textile reinforcements disposed at the two ends of the apron, namely in the portion where the studs are to be fitted, are made according to conventional techniques and do not form any portion of the present invention.

The apron, prepared as described above, is then lapped, vulcanized, and trimmed to impart to it the desired outer girth and to bring it to the desired thickness. Then grooves are formed on its surface and the apron is at last trimmed on its heads, provided with the studs, and controlled in accordance with the normal procedure.

By way of example, the cord fabric used can be a fabric having 13 cotton cords (warps), count 12/4, for each centimeter, said cords being measured in a direction perpendicular to the axis of the apron. Each of said cords has a thickness or diameter of 0.5 mm and a tensile strength of 3.5 kg, so that the apron has a total tensile strength, in the direction of the axis, of $13 \times 3.5 = 45.5$ kg/cm girth.

The winding can be made, for example, with a cord of high resistance rayon, count 1,650/2 having 16Z and 16S twists/decimeter. This cord has a thickness or diameter $d$ of 0.6 mm and is wound up in coils with a pitch of 2 mm. The tensile strength of the cord is 14 kg so that, as five cords are used for each centimeter of width of the apron, its total tensile strength in the direction of the girth of the apron is $5 \times 14 = 70$ kg/cm.

According to an alternative embodiment of the present invention, the three first layers constituting the apron, namely the layer of thin rubber sheet, the treated cord fabric, and the further layer of thin rubber sheet, may constitute a single semifinished product consisting of the cord fabric by means of a calender on each of its two faces with the sheets of rubber composition according to known techniques. This semifinished product, suitably prepared in such a way as to have a width corresponding to the girth of the apron, is then wound up on the mandrel or building up core and butt-jointed, after which the cord or twisted yarn, treated or made adhesive, is helically wound on the unit and the covering sheet of rubber composition is applied onto it according to the above-described steps.

Figure 4:
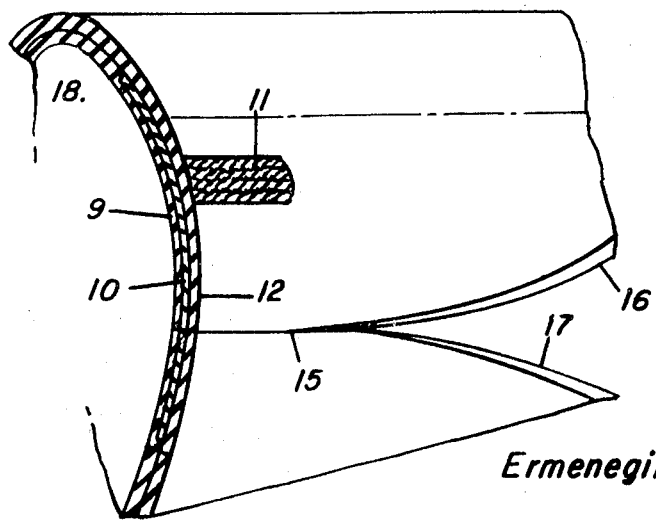
FIG. 4 represents an alternative embodiment of the rubbing apron of the present invention.

As shown in FIG. 4, materials 9, 10 and 12 of FIG. 3 constitute a single semifinished product which, in suitable size, is placed on the mandrel or core 18, and is jointed along a jointing line 15 obtained by approaching and placing its edges 16 and 17 into mutual contact.

The cord fabric or the semifinished product formed doubled with the two rubber layers can be divided or cut into strips of the desired size without cutting the yarns or cords constituting the warp, as it is known to the technicians of the art.

If the width of the fabric is greater than the girth of the apron, a strip as wide and as long as the latter is cut from the fabric or the semifinished product, care being taken to provide an excess of material for the trimming of the heads after vulcanization.

If the girth of the apron is greater than the width of the fabric or of the semifinished product, two or more strips are added by means of longitudinal joints, in order to attain the desired width. The same procedure can be followed to utilize the strips of fabric or semifinished product made available from the prior manufacture of other aprons.

It is evident that this procedure permits an economical production of the aprons, since the scraps of fabric or semifinished product, which at present cannot be conveniently utilized, are eliminated. Moreover, the winding carried out by means of the cords 13 allows the elimination of the scraps of fabric and contributes in carrying out an economical production.

The rubbing apron manufactured according to the present invention has the following characteristics: a perfectly homogeneous structure, a separation of the longitudinal and transversal reinforcing materials which permits their resistance to be proportioned in accordance with the entity of the corresponding stresses, a better flexing resistance since the elements of longitudinal and transversal reinforcement are overlapped and not interwoven as in a ply, and a smaller and more uniform elastic deformability in the longitudinal and transversal direction. Consequently the apron forming the object of the present invention has the best requirements necessary for a perfect regularity of a rubbed sliver and a long service life.

Of course, variations of the specific construction and arrangement of this type device herein disclosed can be made by those skilled in the art without departing from the invention as defined in the appended claims.

I claim:

1. A tubular reinforced flexible structure comprising a first sheet of a rubber composition forming the underlayer of the structure, a first reinforcing layer of cord fabric extending over said sheet with its cords being disposed along the generatrices of said tubular structure, a second sheet of said rubber composition extending over said layer of cord fabric, a second reinforcing layer of a continuous textile reinforcement taken from the group of a cord or a twisted yarn helically wound around said second sheet at a low pitch to the lay of the cords in the cord fabric layer and a third sheet of said rubber composition extending over said textile reinforcement as a cover.

2. A tubular reinforced flexible rubber structure comprising a tubular semifinished product formed by a reinforcing cord fabric covered on each face with a sheet of a rubber composition, the cords of the fabric extending parallel to the generatrices of the product, a continuous textile reinforcement layer in the form of a cord or a twisted yarn helically wound over said semifinished product at a low pitch to the lay of said cords and a covering sheet of said rubber composition extending over said layer.

3. A flexible rubber tubular structure intended in particular to be used as an accessory in machines for the textile industry, said structure comprising a first sheet of a rubber composition forming the underlayer of the structure, a first reinforcing layer of cord fabric extending over said sheet with its cords extending parallel to the generatrices of the said structure, an additional sheet of said rubber composition disposed on said layer of cord fabric, a second reinforcing layer of a continuous textile reinforcement in the form of a cord or a twisted yarn helically wound about said additional sheet of rubber composition at a small pitch to the lay of said cords, and a covering sheet of said rubber composition.

4. The structure of claim 1 wherein said first sheet is formed into a tubular structure with a butt-joint, said cord fabric layer is disposed on said first sheet with a butt-joint, said second sheet is disposed over said cord fabric with a butt-joint and said third sheet is disposed over said layer of continuous textile reinforcement with a butt-joint.

5. The structure of claim 2 wherein the semifinished product is formed into a tubular shape with a butt-joint and said cover sheet is disposed over said continuous textile reinforcement layer with a butt-joint.

6. The structure of claim 3 wherein the first sheet is a tubular shape formed with a butt-joint, said cord fabric layer is disposed over said first sheet with a butt-joint, said additional sheet is disposed over said cord fabric with a butt-joint and said covering sheet is disposed over said continuous textile reinforcement layer with a butt-joint.

7. The structure of claim 1 wherein a plurality of shallow, closely spaced parallel grooves are circumferentially positioned in the outer surface of said third rubber sheet perpendicular to said cords.

8. The structure of claim 2 wherein a plurality of shallow, closely spaced parallel grooves are circumferentially positioned in the outer surface of said covering sheet perpendicular to said cords.

9. The structure of claim 1 wherein the windings in said continuous textile reinforcement are spaced from each other and wherein said pitch is of a value from one to four times the diameter of said reinforcement.

10. The structure of claim 2 wherein the windings of said continuous textile reinforcement are spaced from each other and wherein said pitch is of a value from one to four times the diameter of said reinforcement.

11. The structure of claim 3 wherein the windings of said continuous textile reinforcement are spaced from each other and said pitch is from one to four times the diameter of said reinforcement.

12. The structure of claim 1 wherein the cord fabric and the continuous textile reinforcement are adhesively treated.

13. The structure of claim 3 wherein the cord fabric and the continuous textile reinforcement are adhesively treated.

14. The structure of claim 2 wherein the cord or twisted yarn is adhesively treated.

15. The structure of claim 1 wherein the structure is formed into a laminate by vulcanizing said first sheet, second sheet and third sheet with said interlying first and second reinforcement layers.

16. The structure of claim 2 wherein the structure is formed into a laminate by vulcanizing said semifinished product and covering sheet with said interlying continuous textile reinforcement layer.

17. The structure of claim 3 wherein said structure is formed into a laminate by vulcanizing said first sheet, said additional sheet and said covering sheet with the interlying first and second reinforcing layers.

18. A flexible rubber tubular structure intended in particular to be used as an accessory in machines for the textile industry comprising an underlayer of a first sheet of a rubber composition formed into said structure with a butt-joint, a first reinforcing layer of an adhesively treated cord fabric disposed on said underlayer with a butt-joint, the cords of said fabric extending parallel to the generatrices of said structure, a second sheet of said rubber composition disposed over said layer of cord fabric with a butt-joint, a second reinforcing layer of an adhesively treated continuous textile reinforcement in the form of a cord or a twisted yarn helically wound about said second sheet with spaced wrappings laid at a pitch of from one to four times the diameter of the cord or yarn to the lay of said cords and a third sheet of said rubber composition disposed over said helically wound layer of continuous textile reinforcement with a butt-joint, said structure being formed into a laminate by vulcanizing said first, second and third sheets with the interlying first and second reinforcing layers.

* * * * *